United States Patent [19]
Richter

[11] Patent Number: 4,765,297
[45] Date of Patent: Aug. 23, 1988

[54] INTERNAL-COMBUSTION ENGINE HAVING AT LEAST TWO INTAKE VALVES PER CYLINDER

[75] Inventor: Herwig Richter, Bietigheim, Fed. Rep. of Germany

[73] Assignee: Dr. Ing. h.c.F. Porsche Aktiengesellschaft, Stuttgart, Fed. Rep. of Germany

[21] Appl. No.: 102,834

[22] Filed: Sep. 30, 1987

[30] Foreign Application Priority Data

Oct. 2, 1986 [DE] Fed. Rep. of Germany ....... 3633509

[51] Int. Cl.$^4$ .............................................. F02B 15/00
[52] U.S. Cl. .................................... 123/432; 123/472; 123/493
[58] Field of Search ................ 123/432, 493, 492, 472

[56] References Cited

U.S. PATENT DOCUMENTS

| | | | |
|---|---|---|---|
| 4,548,175 | 10/1985 | Kawai et al. | 123/432 |
| 4,614,174 | 9/1986 | Tanigawa et al. | 123/432 |
| 4,641,620 | 2/1987 | Yoshimura et al. | 123/432 |

*Primary Examiner*—E. Rollins Cross
*Attorney, Agent, or Firm*—Barnes & Thornburg

[57] ABSTRACT

An arrangement for an internal-combustion engine having at least two intake valves for achieving a more abundant course of the torque in the partial-load operation and a high output in the full-load operation, is equipped with separate intake pipes that are dimensioned differently with respect to their length and/or their diameter and separately lead to the intake valves. The shorter intake pipe is closable by a flap. Each intake pipe is equipped with a separate fuel injection valve. A total fuel quantity that is determined by an injection control computer, during the opening and closing of the flap, corresponding to the flow conditions that change in the intake pipes, is apportioned to the two intake pipes via the injection valves. As a result, in addition to the favorable operating behavior of the internal-combustion engine, in the whole torque and load range, an optimal apportioning and formation of the mixture is achieved, even during the opening and closing of the flap.

6 Claims, 5 Drawing Sheets

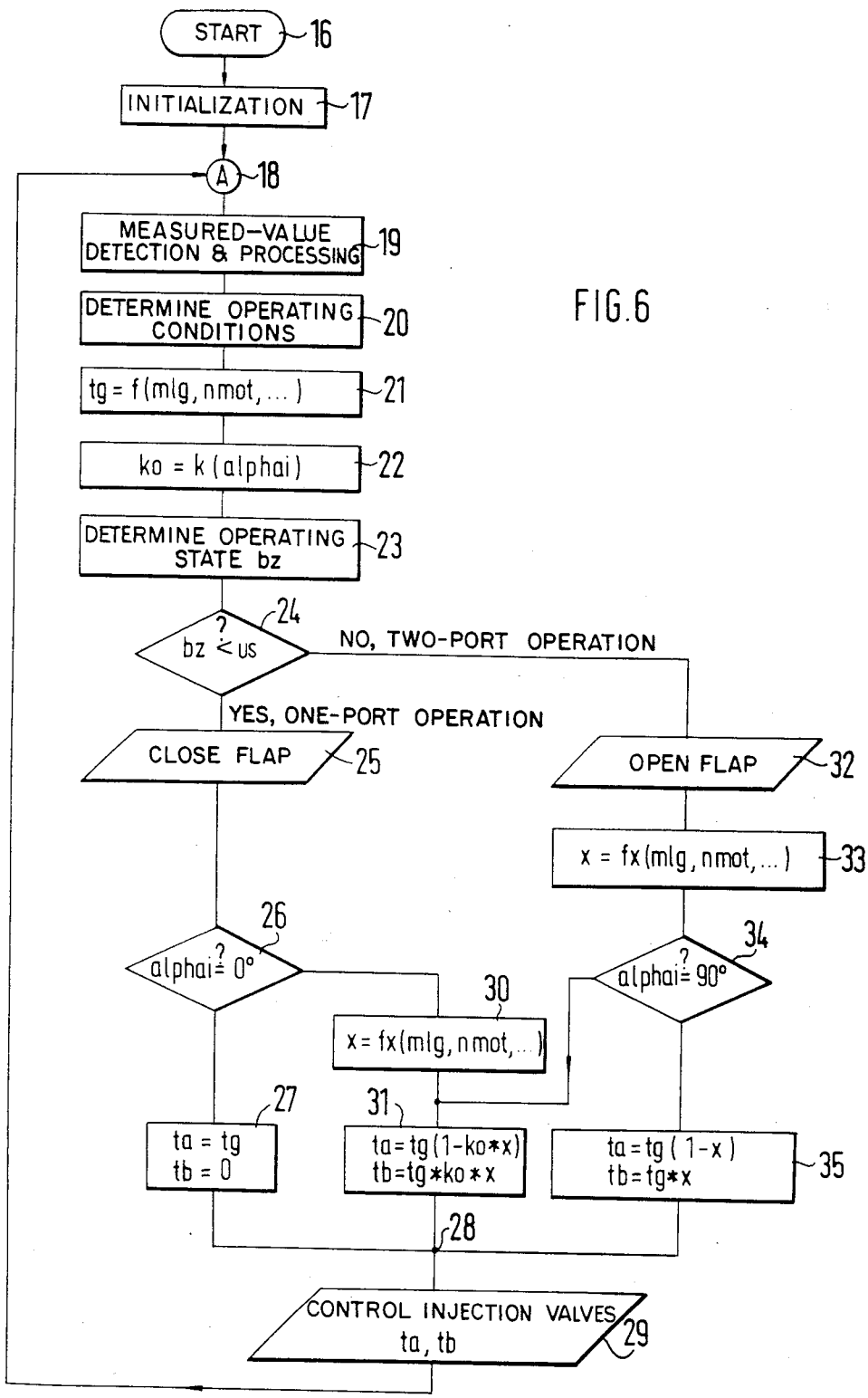

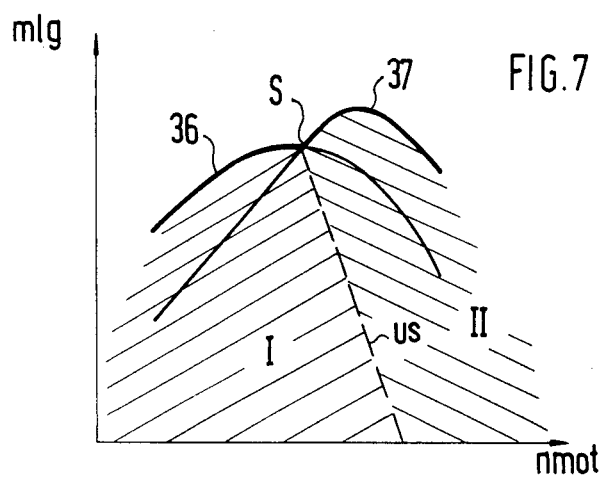
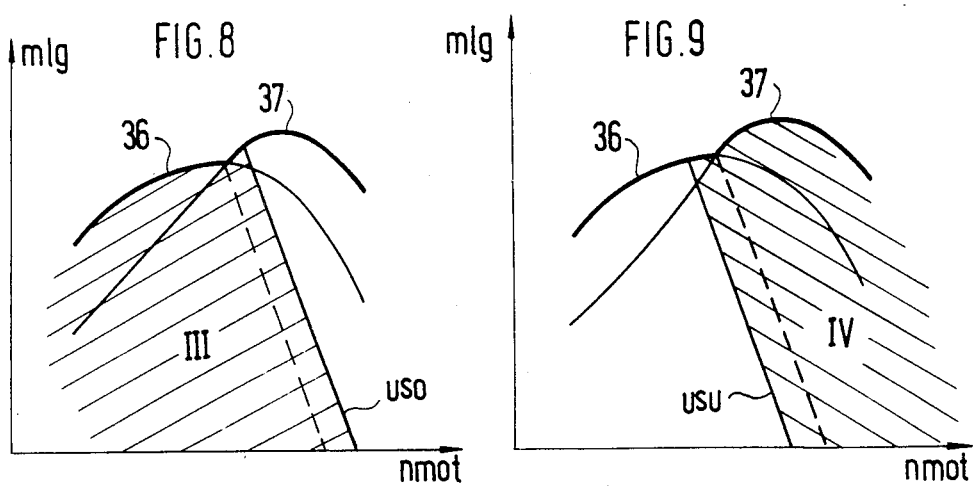

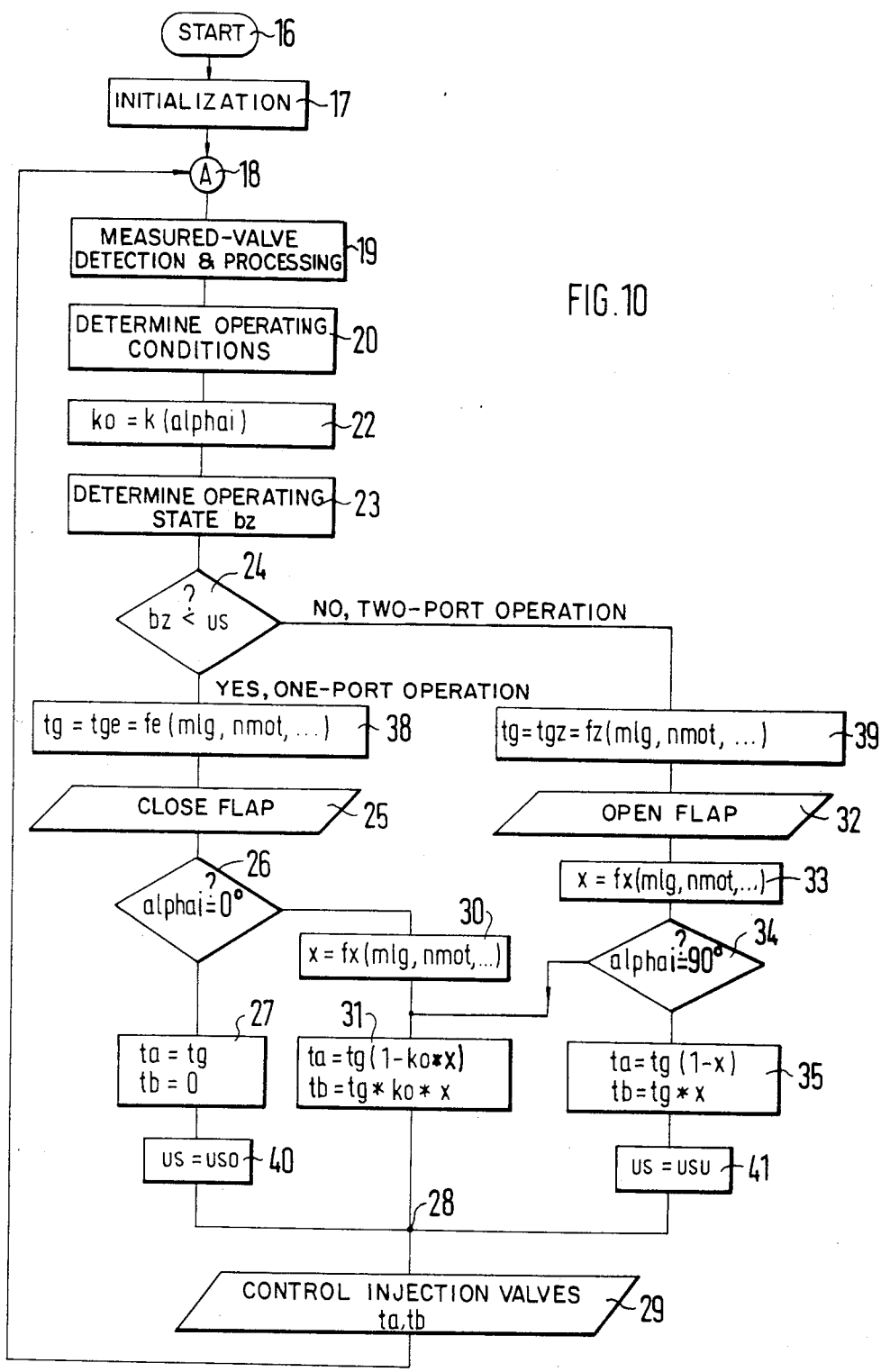

INTERNAL-COMBUSTION ENGINE HAVING AT LEAST TWO INTAKE VALVES PER CYLINDER

BACKGROUND AND SUMMARY OF THE INVENTION

The present invention relates to an arrangement for a multi-cylinder internal-combustion engine having at least two intake valves per cylinder to which separate first and second intake pipes lead that are dimensioned differently with respect to length and/or cross-section and are each equipped with a fuel injection valve. A controllable flap is in at least the second intake pipe, this flap being opened and closed as a function of an operating state of the internal-combustion engine determined from operating conditions of the engine.

Because of the achievable higher volumetric efficiency, internal-combustion engines are frequently equipped with two intake valves for each cylinder. In order to fully utilize the performance yield that can be achieved by this technology, it is necessary to keep the intake pipes leading to the intake valves as short as possible. However, this has a negative influence on the torque characteristics of the internal-combustion engine in the lower rotational speed range so that an abundant course of the torque that is desirable in motor vehicle engines cannot be achieved in this rotational speed range. This range, in turn, requires suction pipes that are as long as possible which, however, limits the achievable performance yield at high rotational speeds.

For this reason, it was suggested in German Utility Model No. 1,986,850 to equip the two intake pipes leading to the two intake valves with different lengths and cross-sections, in which the shorter pipe, in the lower rotational speed range, is closed by a flap and is opened in the upper rotational speed range. However, this is a carburetor-type internal-combustion engine which in comparison to injection-type internal-combustion engines has the known disadvantages of the unfavorable injection site and therefore of the required mixture flow reversal of occurring fuel condensation at the suction pipe walls.

These known disadvantages can be avoided when a manifold injection is used for the mixture formation instead of a carburetor. In order to avoid an excessive stratifying of the charge, one injection valve is provided for each intake pipe. However, in this case, problems occur when the intake port for the full-load operation and its injection valve are connected because the flow conditions in the two intake pipes change with respect to one another during the connecting or disconnecting with the movement of the flap. It was therefore suggested in German Published Unexamined Patent Application No. 3,444,356 to control the injection valve by means of several injection pulses even before the complete opening or during the closing of the flap. However, here also, a faulty adaptation of the mixture occurs during the change-over phase because the intake mixture is adapted only incompletely to the changing flow conditions in the intake pipes.

It is therefore an objective of the present invention to carry out a fuel feed to a fuel-injected internal-combustion engine having two intake pipes for each cylinder so that a faulty adaptation of the mixture and/or a charge stratification during the opening and closing of a controllable flap is avoided in one of at least two intake ports.

This and other objectives are achieved in an arrangement for an engine having two intake valves per cylinder to which separate first and second intake pipes lead, by providing control means for apportioning between the intake pipes via the injection valves a total quantity of fuel fed to the cylinder during the opening and closing of the flap corresponding to flow conditions changing with movement of the flap in the intake pipes.

The main advantages of the invention are the fact that in the case of an internal-combustion engine that is equipped with at least two intake pipes and of which at least one can be closed via a flap, a faulty adaptation of the mixture and a stratification of the charge during the opening and closing of the flap is avoided in that a total amount of fuel that is to be fed to a cylinder, corresponding to the flow conditions that change with the movement of the flap in the intake pipes, via the respective injection valves, is apportioned to the two intake pipes.

Other objects, advantages and novel features of the present invention will become apparent from the following detailed description of the invention when considered in conjunction with the accompanying drawings.

BRIEF DESCRIPTION OF THE DRAWINGS

FIG. 6 is a preferred embodiment of a flow chart of an injection quantity determination for the injection valves.

FIG. 7 is a rotational-speed load diagram with a change-over threshold.

FIG. 8 is a rotational-speed load diagram according to FIG. 7 but with an upper change-over threshold.

FIG. 9 is a rotational-speed load diagram according to FIG. 7 but with a lower change-over threshold.

FIG. 10 is another preferred embodiment of a flow chart similar to FIG. 6, but with a change-over threshold with hysteresis.

DETAILED DESCRIPTION OF THE DRAWINGS

Figure 1:
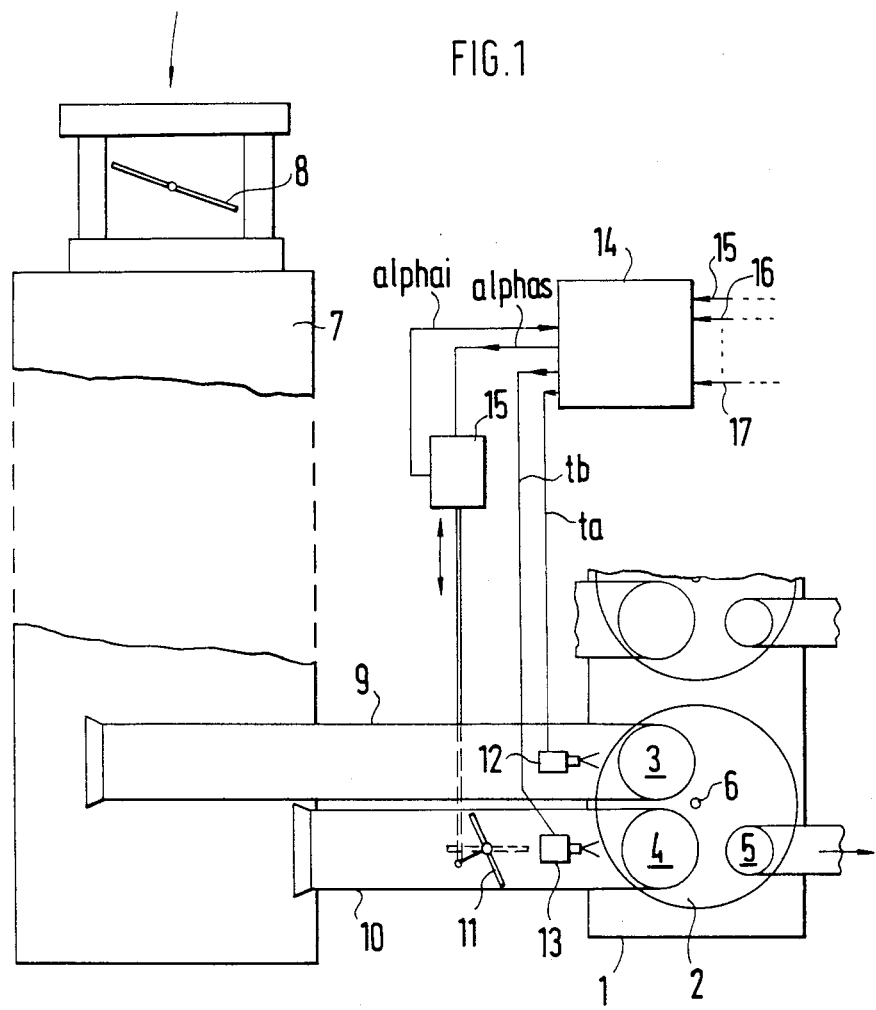
FIG. 1 is a four-valve internal-combustion engine having an intake system constructed according to a preferred embodiment of the present invention.

In FIG. 1, reference number 1 shows an internal-combustion engine, the cylinder 2 of which has at least two intake valves 3, 4 and at least one exhaust valve 5 as well as a spark plug 6. An intake air distributor 7, has a throttle valve 8 arranged in its intake opening. Separate first and second intake pipes 9, 10 lead to the intake valves 3, 4 from the intake air distributor 7. The intake pipes 9, 10, in order to achieve a favorable torque behavior or overall-performance behavior of the internal-combustion engine, have different dimensions with respect to length and/or cross-section. The first intake pipe 9 that is adapted to the partial-load range has a larger length than the second intake pipe 10 that is adapted to the full-load range. In this case, the second intake pipe 10 can be opened and closed by a flap 11.

In both intake pipes 9, 10, injection valves 12, 13 are arranged which inject a fuel quantity corresponding to the output signals ta, tb of a control instrument 14 into the intake pipes 9, 10. For reasons of clarity, the fuel feed lines are not shown. The output signals ta, tb of conventional fuel injection systems with intermittent fuel injection are normally pulse-width or pulse-duration-modulated voltage signals, the pulse duty factor of which is also called injection time. For a constant fuel pressure at the injection valves, the injected fuel quantity is practically proportional to the injection time so that in the following the output signals ta, tb are called fuel quantities.

The flap 11, by means of an adjusting mechanism 15, corresponding to a control signal (desired flap position alphas) made available by the control instrument 14, is controlled into its opened (alphas=90°) or into its closed position (alphas=0°). For the determination of the fuel quantities ta, tb to be injected by the injection valves 12, 13 and of the desired alphas position of the flap, the control instrument 14, in a manner that is known per se, via the input signals 15 to 17, determines various operating conditions of the internal-combustion engine, such as an air mass ml fed to the engine, rotational speed nmot of the engine, temperature tm of the engine, etc. as well as an actual position alphai of the flap 11.

As a result of the longer first intake pipe 9, while the flap 11 is closed (one-port operation), the desired "more abundant" course of the torque is achieved in the lower rotational-speed range. When the flap is opened (two-port operation), as a result of the short intake pipe 10, the practically possible maximum performance adjusts itself in the upper rotational-speed range.

However, certain problems occur in this case during the change-over between the one-port operation and the two-port operation:

Because of the inertia of the physical system of the flap and the air flow conditions, the desired stationary or quasi-stationary proportions of the flow in the two intake pipes 9, 10 do not adjust themselves abruptly at the total flow fed to the cylinder 2. One reason is that the flap 11 cannot be moved back and forth in an arbitrarily short period of time between its two end positions. The other reason is that a desired flow ratio occurs only with a certain inertia (among other things, because of the unavoidable flow resistances of the stored air volumes, the timed method of operation of the internal-combustion engine 1 and of the vibrations in the intake pipes 9, 10). This is shown particularly in FIGS. 2 to 4.

Figure 2:
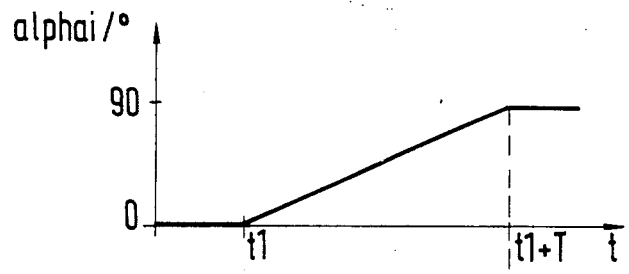
FIG. 2 is an opening-angle time diagram of a flap in an intake pipe.

Corresponding to FIG. 2, it is assumed that the flap 11, by means of the adjusting mechanism 14, during a time period T starting from a point in time t1, is opened approximately linearly. In this case, it shall be assumed in a simplified way for the purpose of further consideration that the flow proportions (air mass proportions) in the two intake pipes, when the flap 11 is open (two-port operation) behave like 1:1.

Figure 3:
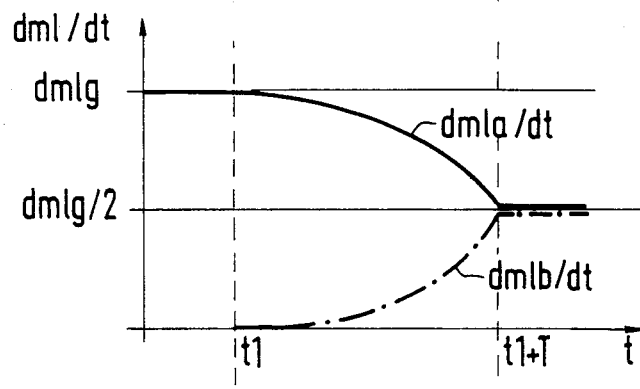
FIG. 3 is an air mass flow time diagram which reflects the time change of the flow conditions in a pair of intake pipes.

FIG. 3 shows how an air mass flow dmla/dt in the first intake pipe 9 during this time period T decreases from dmlg to dmlg/2, and an air mass flow dmlb/dt in the second intake pipe 10 increases at the same ratio, also assuming that the total mass flow dmlg remains approximately constant during this process.

If now the fuel amount ta injected into the first intake pipe 9 were simply, at the start of the opening or when the complete degree of opening is reached, suddenly reduced by half, and the other half of the total amount of fuel tg were injected into the second intake pipe 10, a very faulty adaptation of the mixture and in addition an undesirably severe charge stratification in the combustion chamber would occur in the time period T.

Also, the injection of individual fuel pulses during the change-over phase, as mentioned in German Published Unexamined Patent Application No. 3,444,356, does not result in the required precision of the mixture preparation because the flow conditions in the intake pipes, as shown, change in a very nonlinear way.

Figure 4:
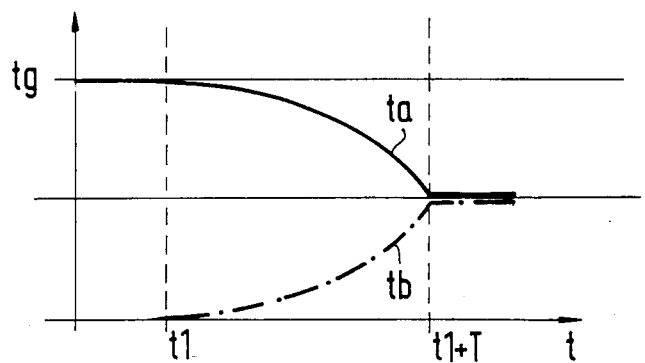
FIG. 4 is a injection quantity time diagram for injection valves in a pair of intake pipes.

In order to obtain an optimal mixture preparation, the total amount of fuel to be fed to the cylinder, during the opening and closing of the flap, must be apportioned to the intake pipes corresponding to the flow conditions that at that moment exist in the intake pipes 9, 10, as shown in the diagram according to FIG. 4.

For the precise determination of the flow conditions, i.e., of the air mass proportions mla, mlb fed to the cylinder via the respective intake pipes per operating cycle and calculating time and of the amount of fuel ta, tb to be injected into the intake pipes, separate air mass measuring devices would have to be arranged in each intake pipe, which however, does not seem useful for reasons of expenditure.

Figure 5:
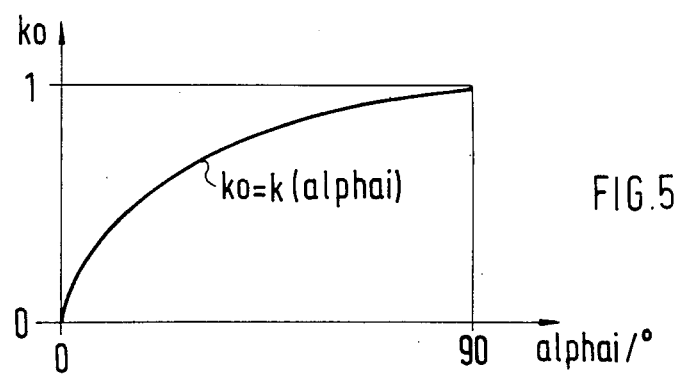
FIG. 5 is an opening function of the flap.

An opening function k(alphai), FIG. 5, is therefore defined which assigns a correction value ko=k(alphai) to an opening angle alphai, by means of which correction value the fuel amounts ta, tb are finally determined (see further below).

This opening function k, if the time period T for the adjusting movement of the flap is selected appropriately, complies with the static and dynamic processes in the intake pipes 9, 10 with good precision of the mixture preparation. In order to determine the total amount of fuel tg, only one single measuring device is required for the determination of the air amount or mass for all suction pipes and cylinders.

As the control instrument 14, a known injection control computer, such as a D- or L-Jetronic or Motronic of Bosch Co. is used, to which only a digital output for the control of the adjusting mechanism 15 of the flap 11 must be added, as well as an analog or digital input for the actual position alphai of the flap 11 and a required control program, as well as another output, including one driver stage each, for each additional injection valve.

A flow chart of a control program of this type is shown in FIG. 6. After a system start 16, during the starting operation of the internal-combustion engine, an initialization 17 of the control instrument 14 first takes place (set back memory, load programs and parameters).

After a marker A, 18, is passed, measured values are first acquired and processed by sensors (not shown), 19. For example, an air quantity or pressure signal is detected in the intake pipe, the rotational speed nmot of the engine, the fuel-air ratio lambda, the engine temperature tm and the flap position alphai are determined and, if necessary, supplemented by other quantities. From these measured values, the operating conditions of the internal-combustion engine are now determined (total air mass mlg as the load information, etc.) 20. The total fuel amount tg to be injected (total injection duration) is determined from a characteristic diagram of the injection time as a function of the operating conditions, tg=f(mlg, nmot, lambda, tm . . . )21, as provided in fuel injection systems according to the state of the art. Finally, the determination of the correction factor ko=k-(alphai) takes place by means of the opening function k from the actual position of the flap alphai, 23, and the determination of the operating state bz of the internal-combustion engine, to see whether it is in the one-port or two-port operation, 23.

It is inquired whether the operating state bz is smaller than a change-over threshold us, 24. If this is the case (one-port operation), the flap 11 is controlled in closing direction, 25. Then it is inquired whether the flap is already closed, (alphai=0°), 26. If this is the case, the total fuel amount tg, via the injection valve 12, is injected into the first intake port 9, the fuel amount ta=tg, the fuel amount tb=0, in the fuel amount determination 27. Via a point 28, the control impulses are emitted for the injection valves 12, 13 in box 29. If this condition 26 is not met, an apportioning factor x is determined from a characteristic diagram fx (mlg, nmot ... ), 30, and the total amount of fuel tg is apportioned corresponding to the actual correction factor ko and the actual apportioning factor x to the injection valves 12, 13 in fuel amount determination box 31. This is done such that in injection valve 12: fuel amount ta=tg (1−ko*x), and in injection valve 13: fuel amount tb=tg*ko*x.

The apportioning factor x takes into account that the air mass flows dmla/dt and dmlb/dt in the two suction pipes 9, 10 generally differ in size and do not, as assumed earlier, have the same proportions. In this rare case where the air mass flow have the same proportions, x=½, whereby the computing formulas are simplified, and the computation of x is not necessary). The apportioning factor x is now defined in such a way that it is the proportion of the air mass mlb guided through the second intake pipe 10, relative to the total air mass mlg fed to the cylinder: x=mlb/mlg. The resulting proportion of the air mass mla guided through the intake pipe is therefore (1−x)=mla/mlg. It should also be added at this point that the fuel injection system is a system with an intermittent fuel injection (or operating method) that determines the fuel quantity tb to be injected or the taken in air mass ml at least once per revolution of the internal-combustion engine. Because of this "integrating" method of operation, the air mass flows dml/dt themselves do not have to be determined but air masses ml are practically obtained automatically (which by time-related integration are obtained from the air mass flows dml/dt).

Since the apportioning factor x is generally not only a function of the geometry of the intake pipes 9, 10, but also of the vibrations developing in the intake pipe (to a more or less nonlinear extent), and the operating conditions of the internal-combustion engine, such as the rotational speed and the load, the apportioning factor x is determined via a characteristic diagram fx (mlg, nmot ... ), for example, from the total air mass mlg and the rotational speed nmot.

However, if the inquiry 24 results in a "no", indicating "two-port operation", the flap 11 is controlled into the open position, 31. Again, the distribution factor is determined, as in instruction 30, in box 33 and an inquiry is made whether the flap 11 is already open, i.e., whether alphai=90°, in box 34. If this is the case, the total fuel quantity tg is apportioned to these intake pipes corresponding to the stationary flow parts in the intake pipes 9, 10 according to the formulas ta-tg(1−x), tb=tg*x, by the fuel quantity determination 35. However, if condition 34 is not met, the fuel quantity apportioning will again be determined corresponding to the correction value ko, 31.

From instructions 31 and 35, the system, as from instruction 27, again returns via point 28 to the control of the injection valves, 29 and from there to marker A, 18. From there finally, the program will run again.

The determination of the operating state according to instruction 23 and the inquiry 24 (bz smaller than us) is shown by means of a rotational-speed load diagram according to FIG. 7. In this example only, it is assumed, for reasons of simplicity and without limitation to this example, that the operating state is determined only from the taken-in air mass ml as load information and the rotational speed nmot of the internal-combustion engine.

The diagram clearly shows two (torque) curves that intersect at an intersecting point S. The curve 36 is obtained for a one-port operation or when the internal-combustion engine is equipped with long suction pipes, and the curve 37 is obtained for a two-port operation or for short suction pipes. Also shown is a change-over threshold us that extends through the point of intersection S, so that the single-port operation is defined in an area I to the left of the change-over threshold US, and the two-port operation is defined in an area II to the right of the change-over threshold US.

When, as described above, the flap control 11 is used, the resulting torque curve (thickly drawn line) extends on the other side of the intersecting point S in each case on the upper branches of the curves 36, 37, in the single-port as well as in the two-port operation.

Under certain circumstances in some internal-combustion engines, this type of control with a fixed change-over threshold, may result in an unstable operation around the change-over threshold us. It therefore would make sense to pull apart the change-over threshold to form a hysteresis with an upper change-over threshold uso and a lower change-over threshold usu, as shown in FIGS. 8 and 9. The change-over from the single-port operation (area III) to the two-port operation (area IV) will then not take place before higher values of the load and the rotational speed are reached, while vice versa the change-over from the two-port operation to the one-port operation takes place for lower values of these quantities.

A flow chart of such a control with hysteresis of the flap position alpha and injection quantities ta, tb is shown in FIG. 10.

The system start 16, the initialization 17, the start of the marker A, 18, the detection of measured values 19, the determination of operating conditions 20 take place according to the flow chart according to FIG. 6, as well as the determination of the correction value ko, 22, of the operating state bz, 23, and of the inquiry bz smaller than us, 24. The determination of the total fuel quantity tg to be injected, however, takes place only after the inquiry 24. The determination also takes place separately for the single-port and two-port operations, namely from a characteristic single-port diagram fe (mlg, nmot . . . ) according to the relationship tg=tge=fe(mlg, nmot ... ), 38 and from a characteristic two-port diagram fz (mlg, nmot ... ), according to the relationship tg=tgz=fz(mlg, nmot ... ), 39. The further run of the program with the control of the flap 11, 25 and 32, the inquiry 26, the correction factor determination 30 and 33 and the inquiry 34 as well as the fuel amount determinations 27, 31, 35 take place as in FIG. 6. Subsequently, after the fuel quantity determination 27, the setting of the change-over threshold us still takes place to the upper change-over threshold us-uso, 40, or after the fuel quantity determination 35, the setting of the change-over threshold us to the lower change-over threshold us=usu, 41. After passing the branching point 28 and the control of the injection valves 29, the return to marker A, 18 takes place and the program runs through again.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for a multi-cylinder internal-combustion engine having at least two intake valves per cylinder to which separate first and second intake pipes lead that are dimensioned differently with respect to at least one of length and cross-section and are each equipped with a fuel injection valve, a controllable flap in at least said second intake pipe, said flap being opened and closed as a function of an operating state of the internal-combustion engine determined from operating conditions of the internal-combustion engine, comprising:

control means for apportioning, between said intake pipes via said injection valves, a total quantity of fuel fed to said cylinder during the opening and closing of said flap corresponding to flow conditions, changing with the movement of said flap, in said intake pipes.

2. An arrangement according to claim 1, wherein said control means includes means for detecting an opening angle of said flap and determining said flow conditions via an opening function which assigns a correction value to said opening angle.

3. An arrangement according to claim 2, wherein said control means includes means for standardizing said correction value, said value assuming a numerical value between 0 for said closed flap, and 1 for said opened flap.

4. An arrangement according to claim 3, wherein said control means includes characteristic diagram means for determining an apportioning factor having a value between 0 and 1 from operating conditions of said engine during two-port operation when said flap is opened completely, wherein flow into said cylinder via said intake pipes of a total air mass is determined as a function of said apportioning factor.

5. An arrangement according to claim 4, wherein said control means includes means for proportioning fuel quantities to be injected by said injection valves, into said intake pipes from said total fuel quantity, during said opening and closing of said flap such that said fuel quantity injected into said first intake pipe is $ta = tg(1-ko*x)$, and said fuel quantity injected into said second intake pipe is $tb = tg*ko*x$, where: ta is said fuel quantity injected into said first intake pipe; tb is said fuel quantity injected into said second intake pipe; tg is said total quantity of fuel; ko is said correction value; and x is said apportioning factor.

6. An arrangement according to claim 5, wherein said control means includes second characteristic diagram means for determining said total fuel quantity during single-port operation and third characteristic diagram means for determining said total fuel quantity during two-port operation, wherein a change-over threshold for marking of said two operating conditions has a hysteresis with an upper change-over threshold for transition of the operating state to said two-port operation, and a lower change-over threshold for transition of the operating state into said single-port operation.

* * * * *